US008105166B2

(12) United States Patent
Cayce et al.

(10) Patent No.: US 8,105,166 B2
(45) Date of Patent: Jan. 31, 2012

(54) FANTASY VAULT SYSTEM FOR MANAGING FANTASY LEAGUE COMPETITOR ENTRY FEES AND AWARDS

(76) Inventors: Ty W. Cayce, Orlando, FL (US); Daniel V. Howard, Orlando, FL (US)

( * ) Notice: Subject to any disclaimer, the term of this patent is extended or adjusted under 35 U.S.C. 154(b) by 1332 days.

(21) Appl. No.: 11/708,972

(22) Filed: Feb. 21, 2007

(65) Prior Publication Data

US 2008/0200254 A1 Aug. 21, 2008

(51) Int. Cl.
*A63F 13/00* (2006.01)

(52) U.S. Cl. ............................... 463/42; 463/40; 700/91

(58) Field of Classification Search .................... 463/40, 463/42; 700/91

See application file for complete search history.

(56) References Cited

U.S. PATENT DOCUMENTS 7,303,472 B2 * 12/2007 Guagliardo ..................... 463/40
2005/0102047 A1 * 5/2005 Ottofy ............................ 700/91
2005/0239549 A1 * 10/2005 Salvatore et al. ............... 463/42
2006/0183547 A1 * 8/2006 McMonigle .................... 463/40
* cited by examiner

*Primary Examiner* — Dmitry Suhol
*Assistant Examiner* — Brandon Gray
(74) *Attorney, Agent, or Firm* — Beck & Tysver PLLC

(57) ABSTRACT

The invention is a fantasy vault system and method for operating a fantasy league, such as a fantasy sports league. The system is independent from the league participants, namely, a fantasy league commissioner and fantasy competitors. Fantasy data providers provides data whereby the performance of the fantasy competitors can be scored and ranked. Different league accounts can be associated with respective distinct data providers. A data provider can be a fantasy host. The system is, therefore, adapted to scoring competitors based on competition data represented in a plurality of formats. The system may accept default and alternate award schemes from commissioners, the particular scheme to be used depending upon the number of competitors paying their entry fee by a deadline. Entry fees from the fantasy competitors are not handled by the league participants, but are deposited into an account in the vault system, from which they may be transferred to a bank account. Awards to successful fantasy competitors from the pool of entry fees are made directly from the vault on or before a payout date, typically chosen by the commissioner.

16 Claims, 2 Drawing Sheets

FANTASY VAULT SYSTEM FOR MANAGING FANTASY LEAGUE COMPETITOR ENTRY FEES AND AWARDS

FIELD OF THE INVENTION

The present invention relates generally to the operation of fantasy leagues. More specifically, it is directed to a virtual vault system for managing league entry fees and awards.

BACKGROUND OF THE INVENTION

A fantasy sports league allows lay people to exercise skill in competing in an activity based upon statistics derived from actual on-field sports competition. According to findings reported in a CNN Money article posted to the Internet in December 2005 (http://money.cnn.com/2005/12/07/technology/fantasysports_fortune__121205/index.htm), fantasy sports in the United States is a billion dollar industry with at least 15 million participants.

In a typical fantasy sports baseball league, for example, each fantasy competitor might create a fantasy team based on the on-field performance of real-life Major League Baseball players, of which the competitor will be the fantasy team manager. Fantasy leagues are virtual leagues, whose competitions are based on vicarious observation of, and performance statistics from, some other activity or competition. In the example just described, Major League Baseball will be termed the underlying activity or the underlying sports league of the fantasy baseball league. The league will be set up prior to, or shortly after the start of, the actual baseball season, typically through a fantasy host (or fantasy platform) website such as ESPN.com, Yahoo Fantasy Sports, or CBS Sportsline Fantasy Sports. Competition in the fantasy league might be quite sophisticated, with players being drafted, traded, or dropped from a fantasy team by its fantasy competitor manager, and virtual head-to-head competitions being held on a regular basis. The fantasy host compiles statistics that allow each fantasy competitor to receive a score based upon various measures of performance of the on-field players during the baseball season. From the score, the performance of the fantasy competitors in the fantasy league can be ranked.

Within the sports realm, fantasy sports leagues have been formed around football, basketball, baseball, soccer, hockey, auto racing, and other sports. More generally, fantasy competitions can be constructed around not only sports activities, but also around any kind of activity in which the fantasy competitors can compete vicariously based upon observations or statistics regarding some underlying activity. A competition might, for example, be based on the performance of portfolios of stocks. We will use the term fantasy league to emphasize the concept that the underlying activity can be sports or practically any other type of activity. For the same reason, we prefer the more general term fantasy competitor over fantasy team manager.

Traditionally, arrangements to establish a fantasy league with the fantasy host are made by a league commissioner. Our use of the term league commissioner refers to a role having the traditional associated functions, rather than the title given to a particular person having that role in a particular league, which is arbitrary. The commissioner is a lay person, typically not having any formal association with the underlying activity. In this model for a fantasy league, which we will refer to as the traditional model, the commissioner recruits the fantasy competitors to participate.

A fantasy data provider provides data regarding the progress or outcome of a fantasy competition, such as statistics about the underlying activity. A fantasy host is a particular kind of fantasy data provider. A fantasy host provides services whereby the fantasy competitors in a league can compete through the host's website and typically computes the scores of the fantasy league competitors after a league ending date.

The services of a fantasy data provider or fantasy host are often provided on a commercial website at no charge or for a modest fee. The appetite of many fantasy sports participants for information about the actual sports players on their fantasy teams has been described as "insatiable," so a fantasy host can generate considerable revenue by licensing website space for advertisements and by selling sports paraphernalia. A fantasy competitor may spend enormous amounts of time on the host's website looking for information that might improve the scoring of her fantasy team within the fantasy league. In this traditional arrangement, the fantasy host gives the commissioner considerable control over league rules, competition, and scoring. Because of this control, the commissioner can customize the league to the needs and desires of the fantasy competitors, for whom he is the representative.

In the traditional model, the fantasy competitors each pay an entry fee to participate in the league. After the fantasy competition has completed, the pool of entry fees will be split and awarded to highly ranked competitors. How many competitors will receive awards and in what percentages of the pool is a decision made by the commissioner before the start of the fantasy competition. The entry fees are collected and held by someone having the role of league treasurer. For clarity, henceforth we will distinguish the "commissioner" role from the "treasurer" role, although the league treasurer is frequently the same person as the league commissioner. After the end of the competition (i.e., in the baseball example, usually after the regular season), the treasurer is responsible for paying out the awards to the successful fantasy competitors.

The league commissioner in the traditional model is local to the league in the sense that she is an individual and not affiliated with a commercial fantasy data provider or host. The league treasurer in the traditional model is also local. Many of the fantasy competitors in the league will be personally acquainted with the local treasurer, as well as with the local commissioner. In a very common scenario, an employee in a business (e.g., an architectural firm) recruits several coworkers to form a fantasy sports league. The employee then serves as league commissioner and the coworkers are fantasy competitors. As mentioned previously, the employee who is the commissioner is typically also herself a fantasy competitor, and often also the league treasurer.

Vesting control of the rules under which team competition is conducted in a local commissioner is an advantage to the commissioner because it is a form of personal networking and bonding that will often reap benefits beyond the confines of the fantasy league. Many local fantasy sports commissioners serve in the role repeatedly out of pure love of the game. Having the league commissioner be local also benefits the fantasy competitors in ways only indirectly related to the competition. While the local commissioner exercises and shows off his organizational skills, fantasy competitors get to show off their sports and managerial prowess. The fantasy competitors also extend and improve their personal and professional networks by participation. The fantasy competitors can affect how the league and competition are configured through influence over the league commissioner. The fantasy competitors and the commissioner might even meet prior to the start of the season to jointly determine such matters as which host to use, which rules will apply, and how awards will be allocated.

Although disagreements between fantasy competitors and the person in the commissioner role sometimes arise (e.g., over scoring rules or interpretation), disputes involving the treasurer role are more common. The treasurer (who, as stated previously, could also be the commissioner) might be lax in collecting the entry fees from all the fantasy competitors. This might result in the league having fewer than the targeted number of teams from the outset. Worse, a fantasy competitor, who has still not paid the entry fee late into the season and who is performing poorly in the fantasy competition, might simply refuse to pay. Although in the traditional model most of the league competitors know the commissioner, often some of the managers are not acquainted with each other. Should they trust an anonymous third party to pay and pay promptly? At season end, the treasurer herself might be late in disbursing awards for whatever reason, or simply never pay them at all. For even the most responsible and attentive of commissioners, having to deal with the league's finances, with almost inevitably some disputes with managers over money, is at best an inconvenience that comes with the job. There is one significant advantage to having a local treasurer, however. Multiple league activities and seasons can be handled by one treasurer. This gives a benefit to long-term competitors who become familiar with expectations about fee payments and payouts, while the league has flexibility in choosing its fantasy hosts.

There is currently an alternative model for operating a fantasy league in which the fantasy host offers to serve as both the commissioner and the treasurer. Although this model resolves most of the problems arising from having a local treasurer handle the league cash, it also eliminates the significant advantage of control of the league rules and configuration by a local commissioner. Decisions traditionally made by the league are unilaterally resolved and dictated by the fantasy host, including for example: that the team must have at minimum number of fantasy competitors (e.g., 10) signed up by a cut-off date or the league will be dropped; the league payout will go to a single fantasy competitor; and competition will be conducted in only one way specified by the particular fantasy host. For its trouble, a substantial portion of the pool goes to the fantasy host rather than the successful fantasy competitors. The loss of local control in the alternative model for many participants, commissioners and fantasy competitors alike, takes much of the enjoyment out of the league.

SUMMARY OF THE INVENTION

The inventors have recognized that control of fantasy league rules and configuration has been vested, in all prior art models, in the same entity that has responsibility for handling the money. In the traditional model, the local league provides both functions through its commissioner and treasurer. In the alternative model, the treasurer role and the commissioner role are both taken by the organization that also has the fantasy host role.

The inventors have also realized that, on one hand, it makes sense for fee collection, pool retention, and awards distribution to be handled by a credible third party business that is independent of the league. On the other hand, it also makes sense to empower fantasy competitors and commissioners to configure their league for themselves. If that third party is independent of the fantasy data providers, then a person who serves leagues regularly as commissioner can have uniformity in the system used to handle funds, while having flexibility to vary data providers from one league to the next.

The invention is a fantasy vault system that contains a plurality of virtual vaults. The system provides user interface logic implemented using software or electronic digital hardware and accessible over a computer wide area network (WAN), such as the Internet. Throughout this document, including the claims, the word "or" is used inclusively, unless "exclusive or" is clearly intended from the context. Thus, the user interface logic might be implemented in software, hardware, or some combination thereof. The word "logic" will be used hereinafter as a shorthand for "logic implemented using software or electronic digital hardware."

The user interface includes a commissioner interface and a competitor interface. The fantasy vault system, through the commissioner interface, communicates with remote commissioner network capable devices (NCDs). We define an NCD to be an electronic digital device capable of communicating data and instructions across a WAN. Examples include, but are not limited to, digital computers, cell phones, personal digital assistants, portable music players, and portable video players. When we say an NCD is remote, we mean that the fantasy vault system communicates with it over a WAN. A commissioner (i.e., the league representative) interacts with the commissioner interface using a commissioner NCD.

Analogously, the fantasy vault system communicates through the competitor interface with remote competitor NCDs. A competitor interacts with the competitor interface using a competitor NCD.

The fantasy vault system includes fantasy vault management, implemented in logic, that interacts with other aspects of the vault system, such as the user interface. Many parameters associated with league competition received by the fantasy vault system are stored in databases. Throughout this document, we intend the term "database" to be interpreted broadly as information stored in a structured format on an electronic digital medium. Thus, any computer file should be regarded as a database, including a word processor document, a spreadsheet, a text file, as well as a more formal database managed by a database management system such as Oracle or Access. The medium might be any medium capable of storing such files, including, for example, a hard drive, a compact disk, a digital video disk, a magnetic tape, random access memory, or read-only memory.

The fantasy vault system is adapted to receiving an instruction through the commissioner interface to open a vault. The commissioner will be referred to as the vault "owner", but strictly speaking is a licensee. The fantasy vault system stores information about the vault in a database, including a commissioner identifier and a vault identifier. The term "identifier" should be interpreted broadly here and in other contexts in this document. Examples of identifiers include, but are not limited to, a name (e.g., Jane Doe) or a sequence of alphanumeric characters (e.g., an e-mail address or social security number). An identifier might be indirect. For example, if a vaults are uniquely associated with commissioners, then a vault identifier is also a commissioner identifier, and conversely.

In some embodiments, the system requires the commissioner to make arrangements for a vault fee payment through the commissioner interface as part of the process of opening the vault. Here, as in other contexts throughout this document, payment of a fee to the fantasy vault system might be electronic (e.g., credit card, gift card, or electronic funds transfer) or by other means (e.g., check sent by mail or by a delivery service).

The system is also adapted to receiving from a remote commissioner NCD an instruction to establish a league account in a vault. In some embodiments, the vault can only contain a single account at any given time; in others, a single vault can contain a plurality of accounts. The system stores information about the account in a database, including an account identifier and a vault identifier. In some embodiments, the commissioner interface is also adapted to receiving from a remote commissioner NCD one or more of the following items of information for the league: (1) an entry fee deadline; (2) the identity of a fantasy data provider or fantasy host; (3) a target number of league competitors, T; (4) a default award payout scheme to be used if the target number of league competitors is reached; (5) a minimum number of league competitors, M; (6) an alternate award payout scheme applicable to some number of competitors, N, where $M \leqq N < T$; (7) an awards payout date; and (8) arrangements for payment of a league account fee. Such information is stored by the system in one or more databases.

The fantasy vault competitor interface is adapted to receiving instructions regarding league entry fees from a plurality of league competitor NCDs. Received through the interface and stored in a database for each league competitor will be a competitor identifier, a league identifier, and information regarding payment of an entry fee for the competitor. If payment is received, that information will also be stored, along with the payment amount. The entry fees that are deposited into the account are combined by the fantasy vault system to form a league award pool. In some embodiments, the league award pool is deposited into a bank account until the end of the fantasy competition. In some embodiments, the fantasy vault system receives account statements electronically from the bank through a bank interface in the fantasy vault system, including notice of accrued interest on the league account. In some embodiments, transfers between the fantasy vault system and a bank are handled electronically. The fantasy vault system might retain interest from the account as a charge for handling the league's funds.

An important aspect of having league funds collected and managed by a reputable commercial enterprise, rather than a local treasurer, is that deadlines will be predictable and reliably enforced. Therefore, a league entry fee deadline will be established with the vault system. Depending on embodiment, this might be set internally by the system or specified through the commissioner interface. The count of entry fees received from league participants by the deadline will be stored in a database by the fantasy vault system. As mentioned previously, which particular awards payout scheme will be used by the system might vary depending on the number of league entry fees received by the system by the entry fee deadline. If the number is less than a defined minimum, the league account will be canceled and any entry fees already received will be refunded by the system.

Each account is associated with a single data provider, but different accounts can be associated with respective different data providers. In some leagues, the data provided might be sports-related, and in others, not. Accounts associated with two distinct providers might be in the same vault. Two vaults might have accounts associated with distinct data providers. In some embodiments, a first account will be associated with a first fantasy sports host (e.g., Yahoo Fantasy Sports) as its data provider, and a second account will be associated with a second fantasy sports host (e.g., CBS Sportsline Fantasy Sports) as its data provider. From the standpoint of the fantasy vault system, in some embodiments a "data provider" is a remote NCD from which the system obtains data through a data provider interface.

In some embodiments of the invention, the data provider interface (which receives the data) and fantasy sports management (which processes the data) accomodate different data formats from two or more different data providers. For example, one provider might provide data in Extended Markup Language (XML), while another might provide data in "flat" comma-separated format. A third provider might also use XML, but with a different schema of tags. A fourth provider might provide data only by screen-scraping. Baseball data will necessarily be structured differently from football data, even from the same provider. The interface to one data provider might require data to be pushed by the provider, and the other, pulled by the fantasy vault system. The data from the two providers might require different amounts of further processing by the fantasy sports vault. For example, one data provider might provide raw statistics about the underlying activity; the other data provider might simply provide final rankings of a league's fantasy competitors. Some embodiments of the invention can handle a plurality of such variations among data providers; e.g., different formats, content, access means, calculation methods, and analysis requirements. Vault system adaptations for distinct data providers might be required to the data provider interface, computational engines, data delivery and storage systems, and metadata.

A fantasy data provider might be separate and independent from the league participants, as would be the case if the fantasy data provider is a commercial fantasy sports host. On the other hand, a data provider might be a league participant. This might occur if the fantasy league is based on activities of a type that is not normally carried by commercial hosts, such as the business performance fantasy league already discussed, or club swimming.

As mentioned previously, the fantasy vault system can contain two or more league accounts simultaneously. The leagues might have different data providers or different seasons. Or they might pertain to different sports, say hockey and basketball.

A single vault can have distinct accounts corresponding to different respective data providers. It is expected, and possibly might be required by the fantasy vault system, that a vault is established by a person who will be the commissioner for all leagues having accounts in the vault. The idea is that the same person can use the same vault for all fantasy leagues of which she is commissioner, the accounts within a single vault changing over time. In some embodiments, a vault is adapted to containing accounts for two successive league seasons corresponding to the same underlying sports league. For example, a vault might contain an account for a fantasy league having the Major League Baseball 2007 season as its underlying sports league, and later contain a fantasy league account having the 2008 season as its underlying sports league.

After the end of the fantasy league season, each league competitor will receive a score, which will be stored in a database on the fantasy vault system. Generally, fantasy competitors who have performed best in the competition will receive the highest awards. In some embodiments, the league fantasy competitor ranking is based at least in part on rules received through the commissioner interface. The system might compute the score, or the data provider might do so. Based on their respective scores, the league competitors are ranked. The fantasy vault system is adapted to distributing one or more awards from the pool directly (i.e., without handling of the money by a local treasurer or commissioner) to a set of the fantasy competitors based on the league fantasy competitor ranking and an award payout scheme. As mentioned previously, the fantasy vault system might receive through the commissioner interface a target number of competitors and a corresponding default payout scheme to be used if the actual number meets or exceeds the target. The vault system might also receive a minimum number, below which the league will be canceled. The fantasy vault system will set a lower limit on this minimum number, which in some embodiments might be as low as 2. Lower limits on the minimum between 2 and 9 distinguish those implementations of which we are aware of the alternative model by commercial fantasy hosts. Allowing the commissioner to specify a minimum of, say, 2 to 4 competitors gives the commissioner considerable latitude and the league a good chance to proceed to competition.

In some embodiments, the fantasy vault system permits specification through the commissioner interface an alternate scheme which will be applied if the number of entry fees received is at least the minimum specified by the commissioner, but is less than the target. For a league with a target of 8 teams, the commissioner might specify a default awards payout scheme whereby the pool will be divided as follows: 50% for first place; 30% for second place; and 20% for third place; if 4 to 7 competitors pay in time, the pool might be divided as 60% to the first place contestant and 40% to the second place contestant; and if fewer than 4 competitors pay in time, the league will be canceled. The commissioner can specify a plurality of such alternate schemes, for different ranges of numbers of competitors.

Under the traditional model, more often than not the league commissioner participates as a league fantasy competitor. Being a competitor gives the commissioner an opportunity to experience how the league configuration and rules he has selected impact the competition. A commissioner-competitor has an incentive to improve either the current league or the next league for which he is commissioner. The present invention allows the commissioner to be a fantasy competitor, and to specify league parameters (e.g., the identity of the fantasy host) to the fantasy sports vault through the commissioner interface. This is a significant advantage over the alternative model described in the Background section, in which the commissioner role is assumed by the fantasy host.

Enforcement by the fantasy vault system of predictable and reliable deadlines also applies to distributing awards to successful fantasy competitors after the league season ending date. In some embodiments, the system receives a payout date through the commissioner interface. In other embodiments, the fantasy vault system chooses the payout date.

In some embodiments, a fantasy data provider is independent from the fantasy vault system; in other embodiments, they are combined either actually under a single business entity or effectively through a contractual arrangement.

In some embodiments, the league participants, the fantasy data provider(s), and the fantasy vault system are all separate and independent entities.

DETAILED DESCRIPTION OF THE INVENTION

Figure 1:
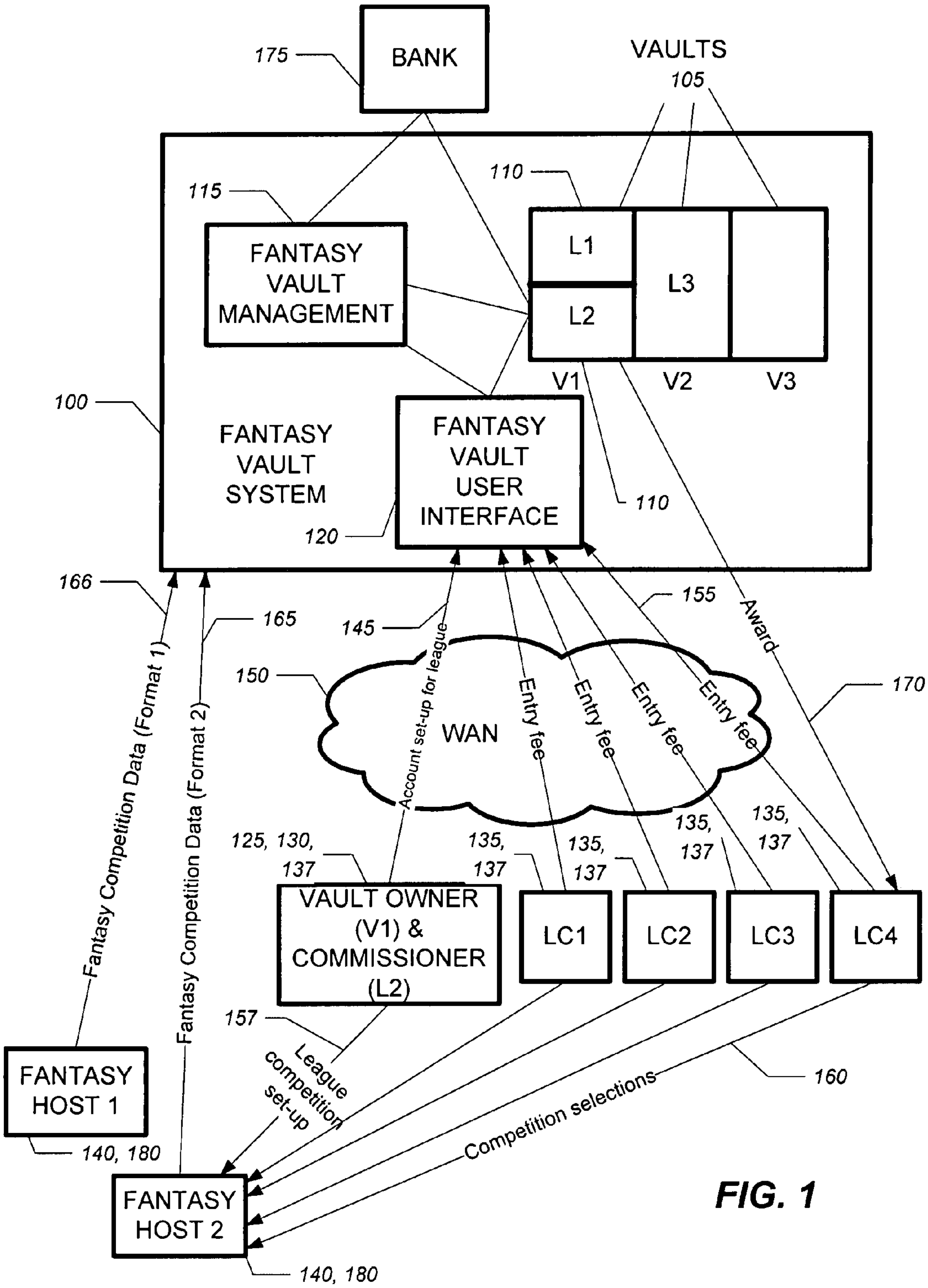
FIG. 1 is a block diagram of an embodiment of the invention.

FIG. 1 illustrates an embodiment of the invention apparatus. The fantasy league participants 137 include a commissioner 125 and a plurality of fantasy league competitors 135. The participants are typically individual people, and the league competitors 135 will usually be personally acquainted with the commissioner 125, but often not with at least some of the other league competitors 135 in the fantasy league. For simplicity, the figure shows only 4 league competitors 135 (labeled LC1 through LC4), although a number between 8 and 12 is more common. All the league participants 137 might work together in a single office or factory, and might all have been recruited by the commissioner to participate. In the figure, the commissioner 125 is not a league competitor 135, although traditionally this has been the exception rather than the rule. As depicted by the arrow labeled 157, the commissioner 125 sets up the league competition with a fantasy host 140, which serves as a data provider 180 regarding the activity underlying the particular league's fantasy competition. This activity might be an actual on-field sports league, or it might be some activity completely unrelated to sports, such as the marketplace performance of portfolios of businesses, scored by some index of performance. In any case, the league competitors 135 specify some selections for the competition to the fantasy host 140 as typified by the "Competition selections" arrow labeled 160 from LC4 to the fantasy host 140 designated "Fantasy Host 2". A characteristic type of competition selection is to pick a team of sports players from an underlying sports league through a fantasy draft. Each league competitor 135 will be scored based upon the on-field performance of his players. In some leagues, players can be (virtually) traded, picked up when they are placed on waiver, and otherwise manipulated in emulation of the activities of the management of the underlying activity.

Continuing to refer to FIG. 1, we see the invention fantasy vault system 100. A central concept of the invention is that the fantasy vault system 100 is separate and independent from the participants 137 of a league. By separate, we mean that they are legally distinct from each other. Examples of pairs in which the two elements of the pair are separate include: a person and a corporation; two people; two corporations not contained in the same corporate hierarchy; a person and a partnership, where the person is not a partner nor an agent of the partnership. By independent, we mean that they deal at arm's length, exercise independent judgment, and are neither under common ownership nor control. The meaning of the terms separate and independent apply elsewhere in this document when the phrase "separate and independent" is used.

This separation allows local control of league configuration while (1) freeing the league participants 137 from the inconvenience of collecting entry fees and otherwise handling the money; (2) guaranteeing that entry fees will be reliably collected by a date-certain; (3) guaranteeing that awards will be distributed to successful competitors by another date-certain; (4) guaranteeing that the funds will be deposited in a secure bank account; (5) allowing customization of league configuration and rules by the league participants 137 through their friendly neighborhood commissioner; and (6) handling contingencies such as unpaid entry fees to be handled in a flexible and responsive way.

The fantasy vault system 100 provides a fantasy vault user interface 120 (e.g., a graphical user interface) implemented in software or electronic digital hardware. The fantasy vault user interface 120 includes a commissioner interface and a competitor interface. A league participant electronic digital device interacts with the user interface over a wide area network such as the Internet; for example, the fantasy vault system 100 might have a website accessible by a user through a browser running on a network capable device (NCD, see description in the Summary section).

The fantasy vault system 100 contains a plurality of vaults 105. In the figure, just three vaults are shown for convenience, labeled 'V1', 'V2' and 'V3'. The vaults 105 are virtual vaults implemented in hardware or software logic and utilizing electronic digital storage to save information about the vault, its contents, the vault owner 130, and the fantasy leagues and fantasy league competitions associated with the vault. For each vault, a vault identifier is associated with a commissioner identifier in storage. In the embodiment shown, the commissioner 125 opens vault V1 and establishes an account for league L1. This is done through the commissioner interface within the fantasy vault user interface 120, as shown by the "Account set-up for league" arrow 145. The fantasy vault system 100 might require, through the commissioner interface, a fee payment to be arranged for either or both of these services (i.e., the vault and the account).

As part of setting up the league account 110, fantasy vault system 100 receives various league parameters through the commissioner interface. The league parameters include an awards payout date, a target number of competitors, and a minimum number of competitors. In some embodiments, the league parameters also include one or more of: a default award payout scheme, one or more alternate award payout schemes, and an entry fee due date.

In some embodiments, a single vault 105 can contain accounts 110 for two or more leagues. In the figure, for example, vault V1 contains accounts for two leagues, labeled 'L1' and 'L2'. In the embodiment shown, the person who is the commissioner 125 of league L2 is also the vault owner 130 of vault V1, as well as the commissioner 125 of league L1. Through this arrangement, the traditional role of a single person serving as commissioner 125 in multiple leagues is facilitated. The fantasy vault system 100 allows flexibility in the choice of data providers 180 while ensuring that funds are handled in a consistent way for all types of leagues and data providers 180.

The primary role of the fantasy host 140 is as a data provider 180, providing data related to the fantasy competition based on some underlying real-world activity, such as a sports competition. This is depicted by the "Fantasy competition data (Format 1)" arrow labeled 165, and the "Fantasy competition data (Format 2)" arrow labeled 166. The fantasy vault system 100 obtains data from a data provider 180 through a data provider interface. In some embodiments of the invention, the data providers 180 are remote from the fantasy vault system 100, and interact across a WAN. In such embodiments, from the perspective of the fantasy vault system 100, a data provider 180 is effectively a remote NCD.

The fantasy host 140 might passively provide statistics regarding the underlying activity, or might actively conduct a regular schedule of head-to-head competitions between fantasy teams, based on the performance data from the underlying activity. The fantasy host 140 might also automatically generate scores for each league competitor 135 at the end of the league season, possibly along with rankings of the league competitors 135. The data provided by the fantasy host 140 to the fantasy vault system 100 can range from raw statistics to final league competitor 135 rankings.

FIG. 1 shows two fantasy hosts 140, which might be associated with two different vaults 105. For example, Fantasy Host 2 might be associated with account L2 in vault V1, while Fantasy Host 1 might be associated with account L3 in vault V2. The figure indicates that Host 1 and Host 2 provide their data in different formats. In some embodiments of the invention, like the one illustrated here, the fantasy vault system 100, through its data provider interface, is adapted to obtain and process data having different formats (e.g, XML; and flat file formats). Some embodiments provide adaptations to the data provider interface whereby fantasy vault management 115 obtains data by different transfer mechanisms for different providers (e.g., Extract, Transform, and Load (ETL) technology; Message Oriented Middleware (MOM) technology; screen scraping; and e-mail). Some embodiments provide interfaces that handle different types of underlying activity from different providers (e.g., baseball, football, and soccer). These variations require adaptations to the data provider interface, as well as to the computations done by logic (hardware or software) in the fantasy vault system 100.

Two different accounts 110 within a single vault 105 might also obtain data from different data providers 180. In the figure, Host 1 might serve L1, while Host 2 serves L2.

A single vault 105 might contain accounts corresponding to successive seasons of a certain on-field league, perhaps using different data providers 180 for the two seasons. This gives the commissioner 125, as organizer and representative of his league, a great deal of flexibility in customization while ensuring stability from one season to the next in how funds are handled. Constancy of the user interface might be enough to maintain loyalty of the commissioner 125 to the fantasy vault system 100.

It should be noted that in other embodiments of the invention (not shown), the fantasy host 140 might be combined with the fantasy vault system 100, or the fantasy vault system 100 might only take data from a single fantasy host 140, possibly through a contractual arrangement requiring exclusivity. While some flexibility is lost to the league participants 137 in their choice of fantasy host 140, such an arrangement does nevertheless vest responsibility for handling of league funds in an independent reliable organization, while giving the league participants 137 local control over other league and competition rules and parameters.

Alternatively, a data provider 180 might not be a fantasy host 140 at all. In fact, the commissioner 125 might himself be the data provider 180 for a league. This arrangement makes the fantasy vault system 100 very adaptable to diverse interests of a group of participants 137, because the underlying activity need not be one that is of any business interest to a commercial fantasy host 140.

The fantasy vault system 100 is managed by fantasy vault management 115, which includes logic in hardware or software relating to management of the vaults 105, the accounts 110, the fantasy vault user interface 120, and interactions with external entities such as fantasy hosts 140 or banks 175. These interactions are depicted by solid lines in the figure. The fantasy vault management 115 can be regarded as the collective computer intelligence of the fantasy vault system 100.

The league competitors 135 make arrangements for payment of an entry fee to participate in the league, as depicted by the "Entry fee" arrows and typified by the arrow labeled 155. The league competitors 135 access the fantasy vault system 100 using remote NCDs. The entry fees might be paid electronically by credit card, gift card, debit card, bank EFT, an online funds transfer service such as PayPal, or even by cash, check, or any other form of payment known in the financial arts. In any case, arrangement for payment of the entry fees is done through the fantasy vault user interface 120.

If entry fees are received from fewer than a target number of league competitors 135, the league might be canceled or an alternate payout scheme might be used. This is described in more detail in connection with FIG. 2.

In the embodiment shown in the figure, the pool of entry fees is deposited securely by fantasy vault management 115 into a bank 175. Preferably, transfers into and out of the bank account will be handled electronically by fantasy vault management 115 through a bank interface, whereby from the perspective of the fantasy vault system 100, the bank 175 behaves as a remote NCD.

After the league season ends, awards will be distributed by the fantasy vault system 100 based upon metrics for league competitor 135 performance selected by the commissioner 125, league competitor 135 rankings based on data furnished by the data provider 180 (in this case, the fantasy host 140), and an award payout scheme selected by the commissioner 125. In FIG. 1, an award is shown by the "Award" arrow labeled 170 going to a single league competitor 135, namely LC4, from the L2 account 110 in the V1 vault 105. Of course, more than one league competitor 135 might be entitled to an award, depending on the award payout scheme. The "Award" arrow in the figure should be interpreted broadly. An award might be sent by mail in the form of a check. The funds might be transferred from the bank upon authorization of the fantasy vault system 100 directly to the league competitor 135. Although the arrow does not go through the WAN, the funds might, in fact, be transferred to an account of the league competitor 135 electronically using the WAN or other computer network. The critical thing, though, is that the commissioner 125 (or local treasurer) does not distribute the awards to the recipient league competitors 135. Distribution is initiated by the fantasy vault system 100 on or before a date-certain and executed without intervention of any league participants 137, the awards going directly to the deserving league competitors 135, addresses for whom are stored in a database of the fantasy vault system 100 in connection with the league account 110.

Figure 2:
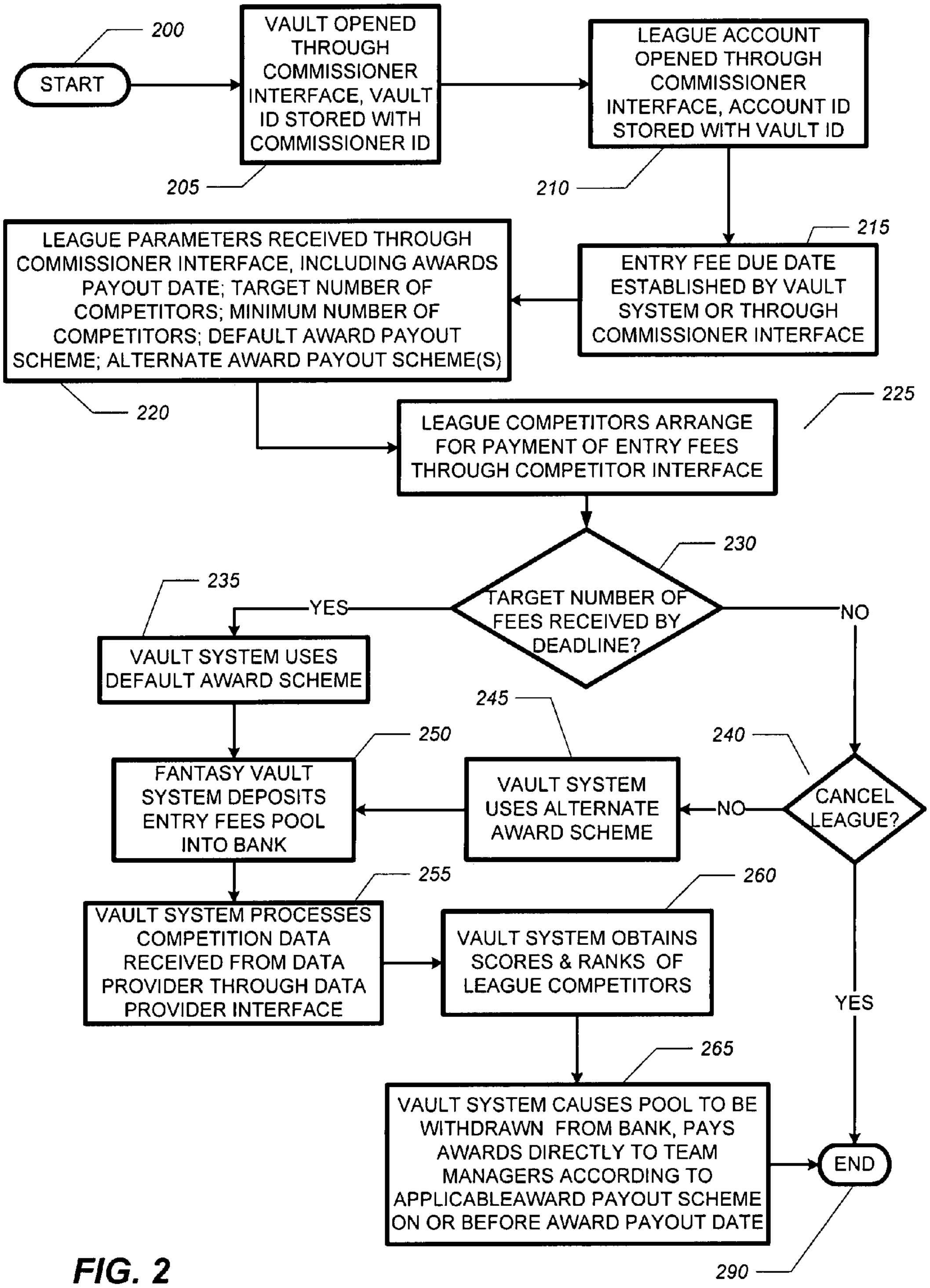
FIG. 2 is a flowchart of an embodiment of the invention.

FIG. 2 is a flowchart depicting an embodiment of the method of the invention. Within the scope of the invention, these steps might not occur in the order shown; some might occur in parallel rather than in series; and some might occur over an extended period of time, overlapping with several other steps. At the start 200, a vault 105 in the fantasy vault system 100 is opened 205 through the commissioner interface. A vault identifier is stored in a database in association with the commissioner identifier. An important aspect of the invention is that the fantasy vault system 100 is separate and independent from the league participants 137, including the commissioner 125 and the league competitors 135. Typically, the commissioner 125 is a local individual who is acquainted with the league competitors 135. The fantasy vault system 100 is typically a business or an service delivered by a business through a fantasy vault user interface 120 across a computer network, such as a wide area network 150 of which the Internet is an example. Commonly, the vault 105 is licensed by a person, who, as the vault owner 130, might reuse the same vault 105 for a variety of fantasy leagues of which he is the commissioner 125. In step 210, a league account 110 is opened through the commissioner interface. The account 110 has an identifier that is stored in a database in association with the identifier of the vault 105.

A due date for the fantasy vault system 100 to receive entry fees from league competitors 135 will be set 215 either by the fantasy vault system 100, or by an instruction received through the commissioner interface, depending on embodiment. If the fantasy vault system 100 allows the commissioner 125 to choose a due date, the fantasy vault system 100 will place some limits on when that can be; for example, it might require that the due date be no later than the start of the league season.

League paramaters are received 220 through the commissioner interface, including (in the illustrated embodiment) an awards payout date, a target number of league competitors, a minimum number of league competitors, and a default and one or more alternate award payout schemes. Embodiments of the invention are distinguished by the lowest value of the target number of league competitors 135 that the fantasy vault system 100 allows the commissioner 125 to specify, each such lowest value of the target number, wherein the target number is greater than or equal to 2, being a distinct embodiment. In some embodiments, the fantasy vault system 100 allows the commissioner 125 to choose a minimum number of league competitors 135; if the number of league competitors 135 paying an entry fee by the entry fee deadline is fewer than the minimum number, then those league competitors 135 who have already paid will be refunded their entry fee. In some embodiments, the fantasy vault system 100 allows the commissioner 125 to specify an alternate payout scheme to handle a situation where the number of league competitors 135 making timely payment of their entry fee is less than the target but greater than or equal to the minimum; for example, the alternate scheme might change the awards percentages corresponding to the scoring ranks. Some embodiments will allow a plurality of contingency plans to deal with various ranges in the numbers of league competitors 135 who pay by the entry fee deadline. Obviously, the fantasy vault system 100 offers much more flexibility to leagues and their commissioners 125 than do commercial fantasy hosts 140 under the prior art alternative model described in the Background section. Some embodiments of the invention allow the commissioner 125 to choose a payout date after the end of the league season. Some embodiments allow the commissioner 125 to choose a payout date before the start of the league season. Some embodiments require the commissioner 125 to name a data provider 180 or, more specifically, a fantasy host 140. In some embodiments, the fantasy vault system 100 may require specifics relating to the conduct of the competition; in these embodiments, the role of fantasy host 140 might be combined with that of fantasy vault system 100.

Once the league has been set up, league competitors can arrange for payment of entry fees; these arrangements are received 225 by the fantasy vault system 100 through its competitor interface. The means of payment will typically be specified by a league competitor 135 through the fantasy vault user interface 120, and might include (like other fees paid to the fantasy vault system 100) credit card, debit card, gift card, on-line funds transfer service such as PayPal, bank EFT, or any other electronic form of funds payment, or even conceivably check, cash or money order, sent by mail or delivery service. The actual number of entry fees received for the league by the entry fee deadline will be stored in a database.

In step 230, the fantasy vault system 100 checks whether the number of fees paid meets or exceeds the target number. If so, the fantasy vault system 100 selects 235 the default award scheme specified through the commissioner interface. Otherwise, the decision is made 240 whether to cancel the league based on whether the minimum number of fees has been received. If the league is canceled, the flow ends. If the minimum has been exceeded, then an alternate award scheme is used 245, where the particular award scheme chosen may depend on the number of entry fees received. An alternate scheme will typically award somewhat different percentages for top-performing league competitors 135 than the default award scheme.

Typically the commissioner 125 sets up the league with a fantasy host 140. (Of course, this activity might well occur before the league account 110 is set up in the vault 105.) As mentioned previously, the fantasy host 140 might or might not be separate and independent from the fantasy vault system 100. In of FIG. 2, the data provider 180 is separate from the fantasy vault system 100, so interaction between the participants and the fantasy host 140 is out of scope of the illustrated embodiment. Once the account 110 with the fantasy host 140 is set up, the league competitors 135 make selections (e.g., choosing players from an underlying professional football league) with the fantasy host 140, the selection process being an important aspect of the fantasy league competition.

If the league is not canceled, then the fantasy vault system 100 deposits 250 the entry fees pool into a bank. The fantasy vault system 100 processes 255 competition data from one or more data providers 180 through the data provider interface. Distinct data providers 180 might require processing different processing depending on the format, content, and state of completeness of the data obtained by the fantasy vault system 100 therefrom. This might be done on an ongoing basis during the entire league season, only once at the end of the season, or anything in between. After the season ends, the fantasy vault system 100 obtains 260 league competitor scores and ranks. It might calculate these indices itself using data from the data provider 180, or the data provider 180 might provide them, eliminating the need for calculation.

Finally, the fantasy vault system 100 causes 265 awards to be withdrawn from the bank and paid directly to successful fantasy competitors according to the operative awards payout scheme. The awards payout occurs without fail on or before the awards payout date specified by the commissioner 125.

The present invention is not limited to all the above details, as modifications and variations may be made without departing from the intent or scope of the invention. Consequently, the invention should be limited only by the following claims and equivalent constructions.

What is claimed is:

1. A fantasy vault system, comprising:

a) nontransitory computer-readable storage containing data regarding a plurality of virtual vaults that are managed through logic implemented in software instructions, which are accessed from the storage, or electronic digital hardware;

b) league accounts for a plurality of fantasy leagues, data about particular league accounts being saved in the storage, including an account identifier, a league commissioner identifier, a vault identifier, and a pool total amount equal to the total of a pool of entry fees of the fantasy league;

c) a fantasy competitor interface, adapted to receive information about teams and fantasy competitors in the fantasy league from remote fantasy competitor network capable devices (NCDs), the information for a particular fantasy competitor including an arrangement for payment of entry fees by the fantasy competitor into the league account;

d) logic whereby entries received before an entry fee deadline into a league account from league fantasy competitors are saved in the storage, each particular entry including the identity of the league fantasy competitor, the league account identifier, and a payment amount, the payment amount being added to the pool total;

e) an awards payout scheme, saved in the storage and implemented in logic, whereby awards are computed, to be paid from the league account to one or more league fantasy competitors determined to be successful fantasy competitors based upon a competitive ranking of the league fantasy competitors on or before a league payout date; and f) a league commissioner interface, adapted to receive, and to save in the storage, information about a particular league from remote commissioner NCDs, including (i) the identity of a data provider, the fantasy vault system obtaining competition data from the data provider regarding events that occur between a league starting date and a league ending date, from which competition data the competitive ranking is determined, (ii) a league target number of entries, T, (iii) a league minimum number of entries, M, (iv) a default payout scheme, to be used by system logic as the awards payout scheme in the event that the number of entries is no less than the target number, (v) an alternate payout scheme, to be used by system logic as the awards payout scheme in the event that the number of entries is N where $M \leqq N < T$.

2. The fantasy vault system of claim 1, wherein the pool of entry fees corresponding to a particular league accounts is deposited by the fantasy vault system electronically into a bank.

3. The fantasy vault system of claim 1, wherein the commissioner interface is further adapted to receive, and saving in the storage, information about a particular league from remote commissioner NCDs, including:

(vi) for a particular league, the league payout date.

4. The fantasy vault system of claim 1, wherein the commissioner interface is further adapted to receive, and saving in the storage, information about a particular league from remote commissioner NCDs, including:

(vi) for a particular league, the entry fee deadline.

5. The fantasy vault system of claim 1, wherein the commissioner interface is further adapted to receive, and saving in the storage, information about a particular league from remote commissioner NCDs, including:

(vi) for a particular fantasy competitor, information to be used for payment of an award to the fantasy competitor if the fantasy competitor is determined to be successful.

6. The fantasy vault system of claim 1, wherein the fantasy vault system receives competition data for a particular fantasy league from particular fantasy data provider by means of a data provider interface in the fantasy vault system that receives the data from a remote data provider NCD of the fantasy data provider.

7. The fantasy vault system of claim 1, wherein the fantasy vault system simultaneously contains a first league account, for a league having competition data received across a WAN from a first fantasy data provider NCD in a first format, and a second league account for a league having competition data obtained from a second fantasy data provider NCD in a second format.

8. The fantasy vault system of claim 1, information about particular vaults being represented in the storage including the identity of a vault licensee and the vault identifier.

9. The fantasy vault system of claim 8, wherein a vault simultaneously contains accounts for two fantasy leagues.

10. The fantasy vault system of claim 1, wherein the fantasy vault system requires that M be specified to be no less than an absolute minimum, where the absolute minimum is a number between 2 and 9.

11. The fantasy vault system of claim 1, wherein the competition data relates to underlying sports activity.

12. The fantasy vault system of claim 1, wherein the pool is deposited by the fantasy vault system into a bank through a bank interface in the fantasy vault system connected to a remote bank NCD.

13. The fantasy vault system of claim 1, wherein the fantasy vault system charges a fee to establish an account for a particular league that does not depend upon the target number of fantasy competitors, nor upon the number of timely fantasy competitors, nor upon the minimum number of fantasy competitors.

14. The fantasy vault system of claim 1, wherein the league fantasy competitor ranking is based at least in part on rules specified through the league commissioner interface to the fantasy vault system.

15. The fantasy vault system of claim 1, wherein the fantasy vault system accepts league entry fees by electronic payment arranged through the fantasy competitor interface.

16. The fantasy vault system of claim 1, wherein the award payout scheme divides the entire pool among the successful fantasy competitors.

* * * * *